United States Patent [19]
Van Dyk, Jr.

[11] 3,815,488
[45] June 11, 1974

[54] FOOD PROCESSING APPARATUS

[75] Inventor: Garritt C. Van Dyk, Jr., Succasunna, N.J.

[73] Assignee: Con-Ray, Inc., Cliffside Park, N.J.

[22] Filed: May 22, 1972

[21] Appl. No.: 255,586

[52] U.S. Cl................ 99/339, 99/340, 99/443 C
[51] Int. Cl................ A47j 27/14, A47j 44/00
[58] Field of Search............ 99/339, 340, 352, 355, 99/360, 370, 373, 386, 423, 443, 451, 467, 474, 475, 476; 198/229

[56] References Cited
UNITED STATES PATENTS

| | | | |
|---|---|---|---|
| 2,454,370 | 11/1948 | Beaubien | 99/339 X |
| 2,529,253 | 11/1950 | Hoffman et al. | 99/339 X |
| 3,039,379 | 6/1962 | Brown et al. | 99/360 X |
| 3,125,017 | 3/1964 | Tauber et al. | 99/443 C |
| 3,288,054 | 11/1966 | Weprin et al. | 99/451 X |
| 3,417,973 | 12/1968 | Englander | 99/360 X |
| 3,455,231 | 7/1969 | Larmuseau | 99/339 |
| 3,690,895 | 9/1972 | Amadon et al. | 99/443 C X |
| 3,695,170 | 10/1972 | Ehrenberg | 99/443 C X |

Primary Examiner—Billy J. Wilhite
Assistant Examiner—Arthur O. Henderson
Attorney, Agent, or Firm—Sommers & Sommers

[57] ABSTRACT

A food processing apparatus, for processing of consumable matter, such as steaming and broiling sausages in the manufacture of brown and serve sausages, which is provided with processing means which process the consumable matter continuously and uniformly, which is further provided with regulating means which regulate the flow of pressurized steam and steam vapor, to prevent the dispersal of the food products during steaming thereof, and which is further provided with directing means which direct the flow of the exhaust vapors and emissions.

13 Claims, 4 Drawing Figures

FOOD PROCESSING APPARATUS

BACKGROUND OF INVENTION

This invention relates generally to processing devices, and more specifically to food processing apparatus with means for processing the consumable matter, with means for regulating the steaming operation, and with means for directing the exhaust vapors and emissions.

The processing of consumable matter, such as steaming and broiling sausages in the manufacture of brown and serve sausages, has heretofore been accomplished by a batch-process operation, which comprised processing the food products in separate batches, a single batch at a time; the food manufacture operation was discontinuous and non-uniform by virtue thereof. The direct application of pressurized steam and steam vapors during steaming generated uncontrolled dispersal of the food products. Steam and broil exhausts were ineffective in directing the flow of exhaust vapors and emissions.

In accordance with the foregoing, it may be regarded as among the objects of present invention to provide means for generating continuous and uniform processing of consumable matter. It is a further object of the invention to provide means for regulating the flow of pressurized steam and steam vapors to prevent dispersal of the food products during the steaming operation. It is a further object of the invention to provide means for directing the flow of the exhaust vapors and emissions.

The foregoing objects and others, as will become apparent in the course of the ensuing specification, are achieved in accordance with the present invention, by the provision therein of novel processing means, regulating means and directing means, operable, as will be described below, so that the processing of the consumable matter is continuous and uniform, so that the flow of the pressurized steam and steam vapor is regulated to prevent food product dispersal, and so that flow of exhaust vapors and emissions are directed, thereby increasing the efficiency, safety, and utility of operation of the food processing apparatus.

BRIEF DESCRIPTION OF THE DRAWINGS

The invention is diagrammatically illustrated, by way of example, in the appended drawings, wherein similar reference characters indicate like parts, in which.

DESCRIPTION OF PREFERRED EMBODIMENTS

Figure 1:
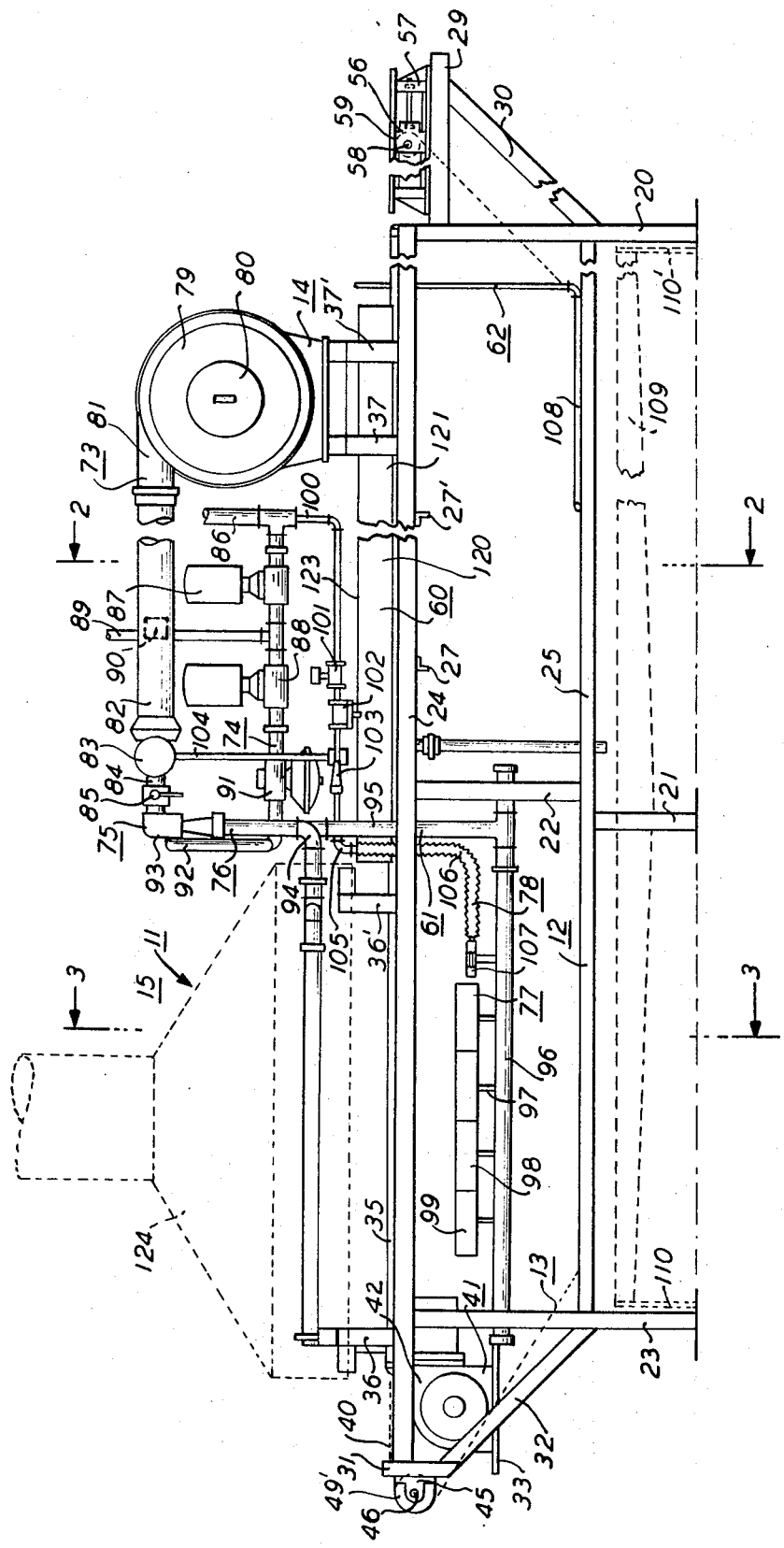
FIG. 1 is a side, elevational view of a food processing apparatus, pursuant to the invention.
Figure 2:
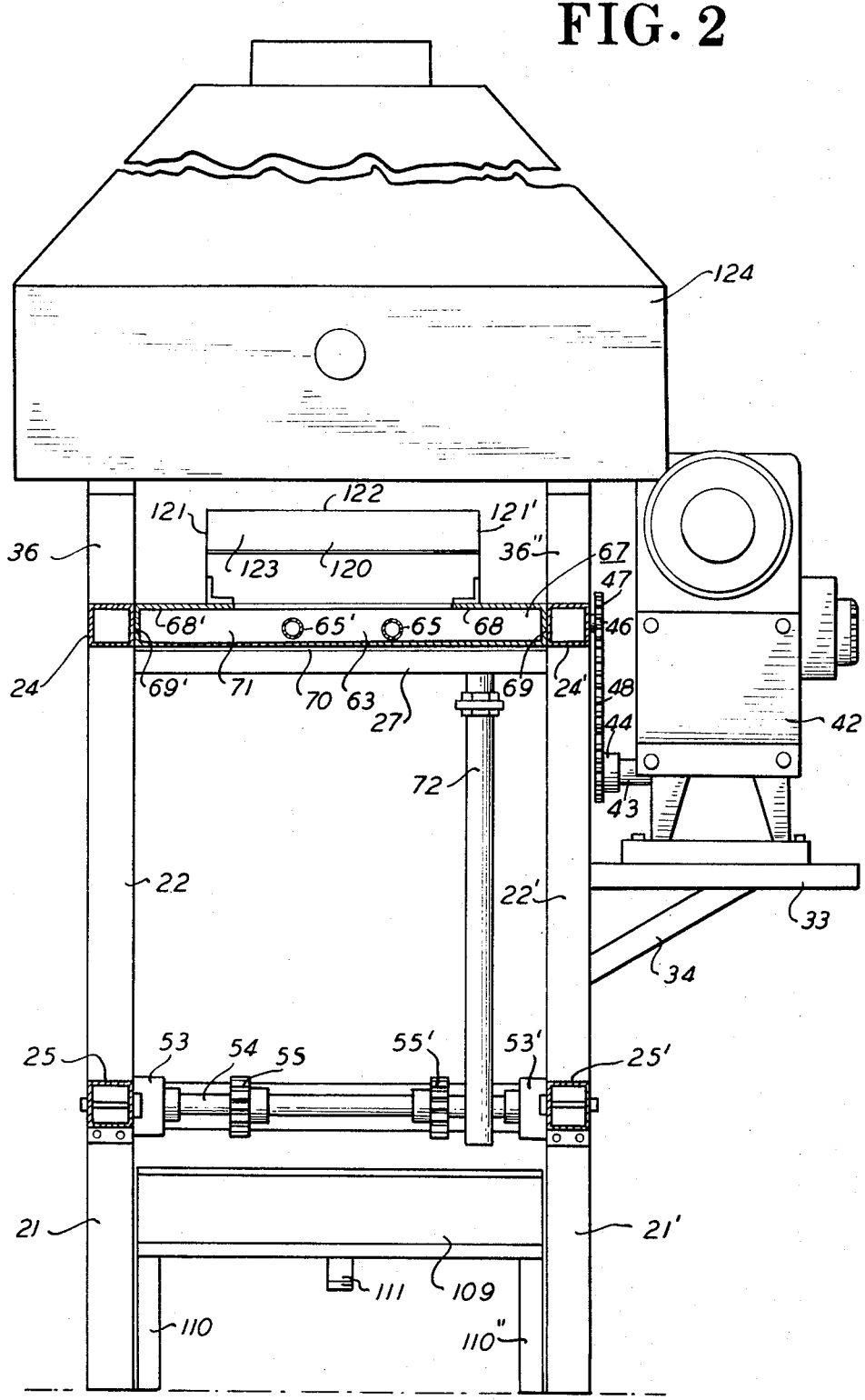
FIG. 2 is a front, elevational cross-sectional view thereof, taken at line 2—2 of FIG. 1.
Figure 3:
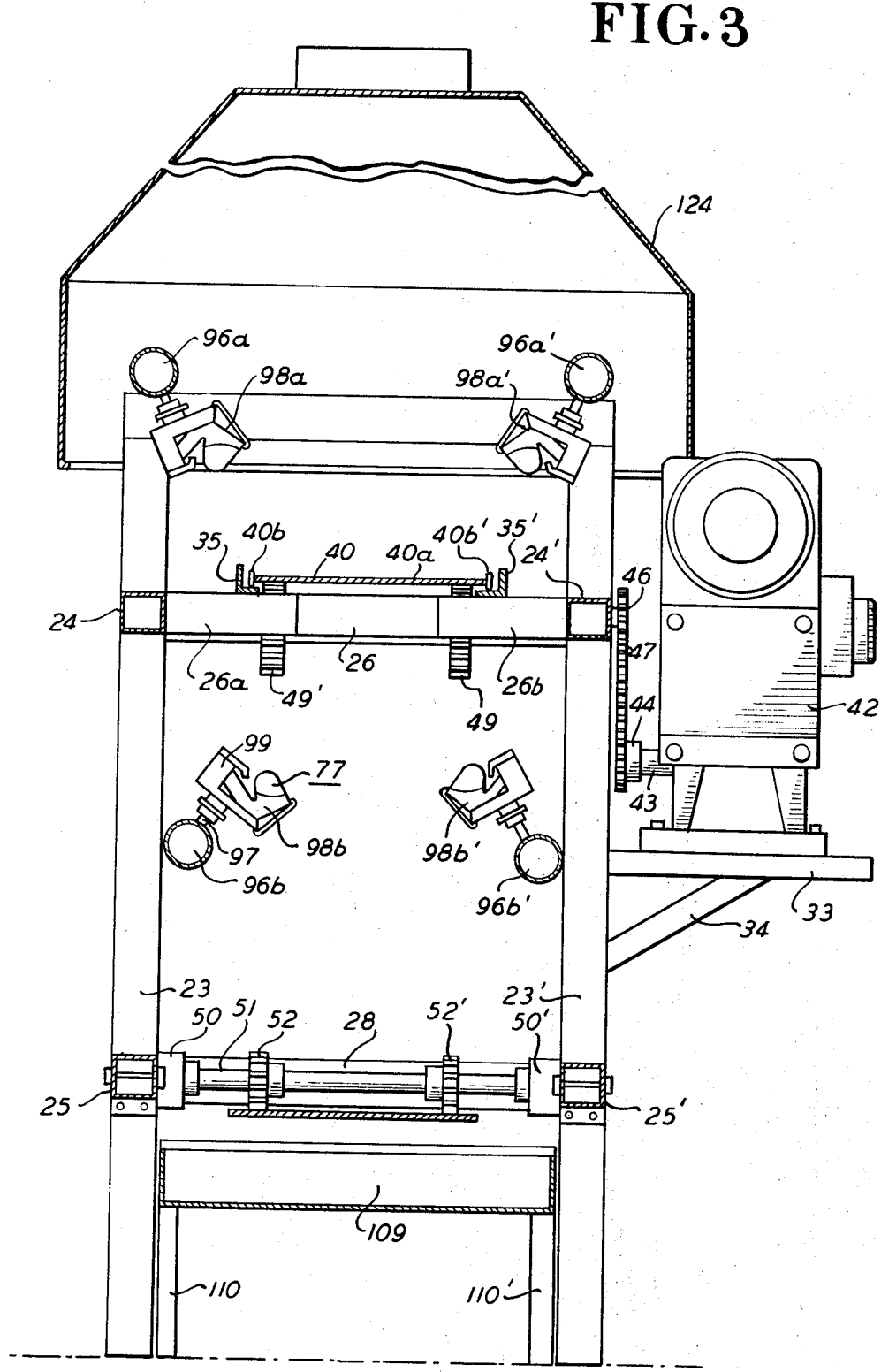
FIG. 3 is a front, elevational cross-sectional view thereof, taken at line 3—3 of FIG. 1.
Figure 4:
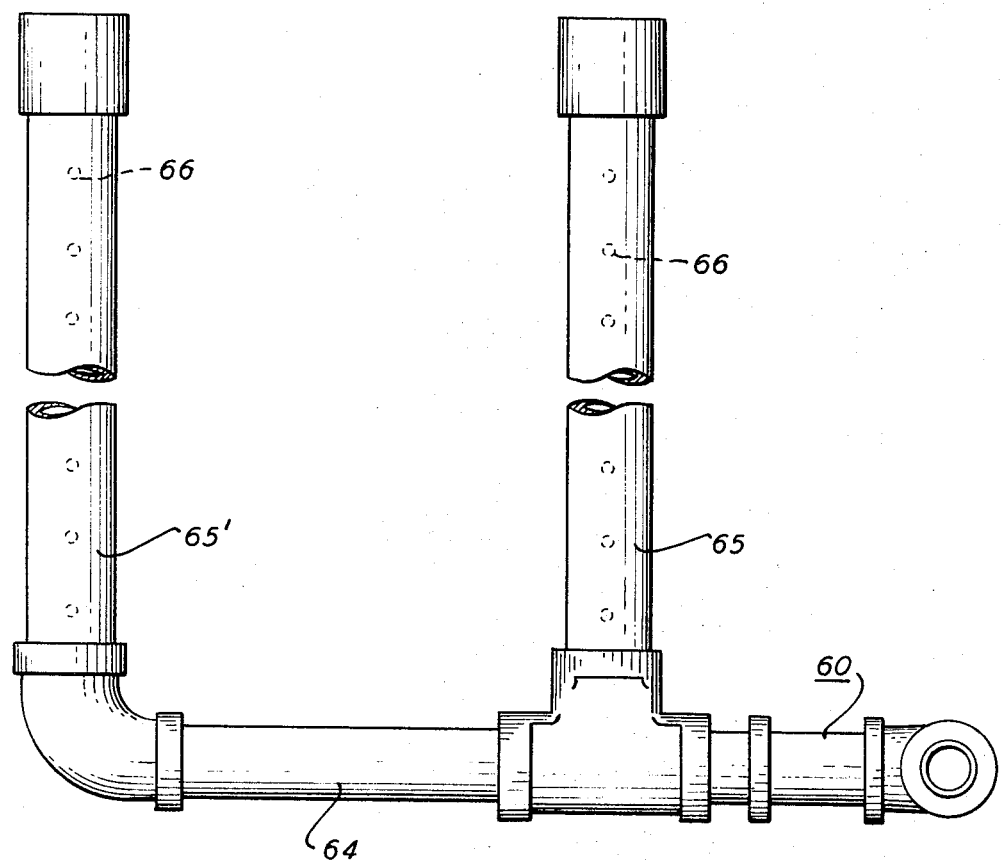
FIG. 4 is a bottom view of the steam manifold pursuant to the invention.

In accordance with the preferred mode of practicing the invention, the food processing apparatus 11 (FIGS. 1-4) comprises a support frame 12, conveying means 13, processing means 14, and directing means 15.

The support frame 12, (FIGS. 1-3), for example, comprises load-end support legs 20 (corresponding support leg on the other side is not shown), center support legs, 21, 21', center support struts 22, 22', takeoff-end support legs 23, 23', upper longitudinal rails 24, 24' which are connected along the lengths thereof to the top portions of the load-end support legs 20 and the center support struts 22, 22' and the takeoff-end support legs 23, 23', lower longitudinal rails 25, 25' which are connected along the lengths thereof to the lower portions of the load-end support legs 20 and the takeoff-end support legs 23, 23' to the bottom portion of center support struts 22, 22' and to the top portion of center support legs 21, 21', upper transverse braces 26 which interconnect the upper longitudinal rails 24, 24' at the takeoff ends thereof (corresponding transverse brace at the load end is not shown), center transverse supports 26a, 26b which extend inwardly from the upper longitudinal rails 24, 24' near the centers thereof, transverse pan braces 27, 27', lower transverse braces 28 which interconnects the lower longitudinal rails 25, 25' at the takeoff ends thereof (corresponding lower transverse brace at the load end is not shown), a load-end platform 29 which is connected to the load-end support legs 20, a load-end brace 30 which interconnects the load-end platform 29 and the load-end support leg 20 (a corresponding load-end brace on the other side is not shown), a takeoff-end vertical support 31, a takeoff-end brace 32 which interconnects the takeoff-end transverse support 31 and the takeoff-end support leg 23 (a corresponding takeoff-end brace on the other side is not shown), a side platform 33, side brace 34 which interconnects the side platform 33 to the takeoff-end support leg 23', guide rails 35, 35' which are supported at the ends thereof on the upper transverse braces 26, and first side supports 36, 36', 36'' and second side supports 37, 37' which are connected to the upper longitudinal rails 24, 24' (corresponding second side supports on the other side are not shown).

Conveying means 13, for example, (FIG. 1) comprises conveyor 40 and driving means 41. The conveyor 40, for example, comprises a chain belt 40a, and side loops 40b, 40b' which extend along the sides of the chain belt. Driving means 41, for example, comprises a drive motor 42 which, in the preferred embodiment, is a variable-speed electric motor, which is mounted to the side platform 33, and which includes a drive shaft 43 which extends therethrough, a drive sprocket 44 which is keyed to the drive shaft 43, first pillow blocks 45, which are mounted through adjustment means (not shown) to the takeoff end vertical support 31, a gear shaft 46 which is rotatably journalled in the first pillow blocks 45, 45', a driven sprocket 47 which is keyed to one end of the gear shaft 46 and which is rotatably journalled in the first pillow blocks 45, 45', and which is vertically aligned with and displaced from the drive sprocket 44, a chain 48 which is entrained about the drive sprocket 44 and the driven sprocket 47, gear sprockets 49, 49' which include gear teeth (not shown) and which are keyed to the gear shaft 46 between the first pillow blocks 45, 45' and which span a width not greater than the width of the conveyor 40, takeoff-end pillow blocks 50, 50' which are mounted to the lower longitudinal rails 25, 25' near the takeoff ends thereof, a takeoff-end idler shaft 51 which is rotatably journalled in the takeoff-end pillow blocks 50, 50', takeoff-end idler gear sprockets 52, 52' which include gear teeth (not shown) and which are keyed to the takeoff-end idler shaft 51 and which span a width not greater than the width of the conveyor 40, center pillow blocks 53, 53' which are mounted to the lower longitudinal rails 25, 25' near the centers thereof, center idler shaft 54 which is rotatably journalled in the center pillow blocks 53, 53', and center idler gear sprockets 55, 55' which include gear teeth (not shown) and which are keyed to the center idler shaft 54, and which span a width not greater than the width of the conveyor 40 (corresponding load-end pillow blocks, which are mounted to the lower longitudinal rails 25, 25' near the load end thereof, and load-end idler shaft which is rotatably journalled in the load-end pillow blocks, and load-end idler gear sprockets which include gear teeth and which are keyed to the load end idler shaft, and span a width not greater than the width of the conveyor 40, are not shown), second pillow blocks 56, 56' which are mounted through an adjustable housing 57 to the load-end platform 29, a cross shaft 58 which is rotatably journalled in the second pillow blocks 56, and carrying gear sprockets 59, which include gear teeth (not shown) and which are keyed to the cross shaft 58, and which span a width not greater than the width of the conveyor 40.

Food processing means 14, for example (FIG. 1) comprises steaming means 60, broiling means 61, and sanitizing means 62. Steaming means 60 comprises a source of pressurized steam (not shown), and regulating means 63 which regulate the flow of steam, and which comprise a steam manifold 64 which is connected to the steam source and which includes extender portions 65, 65' and orifices 66 which are located in the bottom surfaces of the extender portions 65, 65', a condensate pan 67 which is supported by the transverse pan braces 27, 27' and which includes top walls 68, 68', side walls 69, 69', a bottom wall 70, end wall 71 (a corresponding end wall at the other end of the condensate pan which includes spouts therein is not shown), and a condensate drain 72 which is connected to a drain opening (not shown) in the bottom wall 70, and gaps (not shown) which are formed between the steam manifold orifices 66 and the condensate pan bottom wall 70, which may be provided by fittings (not shown) which are connected to the extender portions 65, 65' and which elevate the extender portions 65, 65' above the condensate pan bottom wall 70. Broiling means 61, for example, comprises air supplying means 73, gas supplying means 74, mixing means 75, connecting means 76, heating means 77, and igniting means 78. Air supplying means 73, for example, comprises an air impeller (not shown) which, in the preferred embodiment, is a fan blade, and which is driven by a motor (not shown), a blower housing 70, which encases the air blower therein and which is mounted to the second side supports 37, an intake filter 80 which is connected to one side of the blower housing 79, a spout 81 which extends from the top portion of the blower housing 79, an air header 82 which is connected to the spout 81, a transverse air manifold 83 which is connected to the air header 82 and which includes connector portion 84 (a corresponding connector portion on the other side of the apparatus is not shown), a throttle valve 85 which is connected at the input thereof to the connector portion 84 of the transverse air manifold 83 (a corresponding throttle valve which is connected at the input thereof to the connector portion on the other side of the apparatus is not shown), which throttle valves are connected at the outputs thereof to a first input (not shown) in the mixing means 75. Gas supplying means 74, for example, comprises a source of gas (not shown), an inlet tube 86 which is connected to the gas source, a first electrical shutoff valve 87 which is connected at input thereof to the inlet tube 86, a second electrical shutoff valve 88, a vent tube 89 which is connected at the input thereof across the output of the first electrical valve 87 and the input of the second electrical shutoff valve 88, a vent valve 90 which is connected to the vent tube 89, a zero regulator 91 which is connected at the input thereof to the output of the second electrical shutoff valve 88, a connector 92 which is connected at the input thereof to the output of the zero regulator 91 and which is connected at the output thereof to a second input (not shown) in the mixing means 75 (a corresponding connector which is connected at the input thereof to the zero regulator 91 and which is connected at the output thereof to a second input in the mixing means 75 on the other side is not shown). The mixing means 75, for example, comprises an air-gas mixer 93 which is connected at a first input therein (not shown) to the output of the throttle valve 85, and which is connected at a second input therein (not shown) to the output of the connector 92, (a corresponding air-gas mixer which is connected at a first input therein to the output of a throttle valve on the other side and which is connected at a second input therein to the output of a connector on the other side is not shown), and which include therein, in the preferred embodiment, venturis (not shown) at the first inputs therein and limiting orifice valves (not shown) at the second inputs therein. The connecting means 76 comprises, for example, upper connectors 94, (a corresponding upper connector on the other side of the apparatus is not shown) which are connected at the inputs thereof to the output of the air-gas mixer 93, and lower connectors 95, (a corresponding lower connector on the other side is not shown) which are connected at the inputs thereof to the outputs of the air-gas mixer on the other side (not shown), upper longitudinal manifolds 96a, 96a' which are connected to the outputs of the upper connectors 94 and which are mounted in the support frame 12 by adjustable mountings (not shown) to enable adjustment thereof, lower longitudinal manifolds 96b, 96b' which are connected to the outputs of the lower connectors 95 and which are mounted in the support frame 12 by adjustable mountings (not shown) to enable adjustment thereof, and connectors 97 which connect the upper longitudinal manifolds 96a, 96a' and lower longitudinal manifolds 96b, 96b' with the heating means 77. Heating means 77, for example, comprises upper longitudinal burners 98a, 98a', and lower longitudinal burners 98b, 98b' which comprise rows of modules 99 which, in the preferred embodiment, include contoured refractory members which, when scrubbed with high temperature gas flame, are heated and transfer heat from the surfaces thereof. Igniting means 78, for example, comprises a gas connector 100 which is connected to the gas through the inlet tube 86, a control valve 101 which is connected to the output of the gas connector 100, a zero regulator 102 which is connected at the input thereof to the output of the control valve 101, and which is connected at the output thereof to a first input (not shown) in an air gas mixer 103, an air connector 104 which is connected at one end thereof to the air source through the transverse air manifold 83 and which is connected at the other end thereof to a second input (not shown) in the air mixer 103, an air-gas mixer 103 which includes therein, in the preferred embodiment, a limiting orifice valve (not shown) at the first input therein, and a venturi (not shown) at the second input therein, a connector 105 which is connected at the input thereof to the output of the air gas mixer 103, and flexible hoses 106 which are connected at the inputs thereof to the outputs of the connector 105 and pilot tips 107 which are connected to the flexible hoses 106 and which are mounted to the upper longitudinal manifolds (not shown) and the lower longitudinal manifolds 96 and which include attached thereto spark ignitors (not shown) (corresponding connectors, flexible hoses, pilot tips, and spark ignitors which are connected and mounted to the upper longitudinal manifolds and the lower longitudinal manifold on the other side are not shown). Sanitizing means 62 comprises, for example, a source of water (not shown), a transverse spray bar 108 which is connected to the water source and which extends across the path of movement of the conveyor 40, and a drip pan 109, which is supported on support legs 110, 110' (corresponding support legs on the other side are not shown) and which includes a drain 111 therein.

The directing means 15, for example, (FIGS. 1 and 2) comprises steam hood 120 which includes side walls 121, 121', a top cover portion 122, and end portions 123, (a corresponding end portion at the other end is not shown) and which is supported along the sides of the guide rails 35, 35' and a broiler hood 124 which is supported on first side supports 36, and which includes an exhaust blower (not shown) and a hinge along one edge thereof.

To initiate operation of the apparatus, for example, the operator actuates pushbuttons on a control panel (not shown), to operate the air supplying means 73 by actuating the blower motor to generate movement of the fan blade (not shown) in the blower housing 79, to operate the gas supplying means 74 and the igniting means 78 by actuating the gas source (not shown) and by signalling the first electrical shutoff valve 87 and the second shutoff valve 88 to open and the vent valve 90 to close and by signalling the control valve 101 to open and by actuating the spark ignitors on the pilot tips 107 to ignite the combustible air-gas mixture in the longitudinal burners, and to operate the driving means 41 to generate movement of the conveyor 40. Upon actuating the air supplying means 73, air is drawn into the blower housing 79, through the intake filter 80 which filters the air to prevent dust and small particulate matter from being drawn into the blower housing 79, and the rotation of the fan blade directs the air through the spout 81 in the blower housing 79, to the air header 82, through the transverse air manifold 83 and the connector portions 84 thereof, and through the throttle valves 85 which provide single valve controls for the quantity of heat generated by the apparatus, to venturis (not shown) which cause the air to increase in speed and drop in pressure through first inputs (not shown) in the mixing means 75. Upon actuating the gas supplying means 74, gas flows through the inlet tube 86, to the first electrical shutoff valve 87 which closes automatically in the event of a pilot flame failure or an electrical power failure, through the inlet of the vent tube 89 which is controlled by the vent valve 90 to open if the electrical shutoff valves 87 or 88 fail to close in the event of a pilot flame failure or an electrical failure, to the second electrical shutoff valve 88 which closes automatically in the event of a pilot flame failure or an electrical power failure, through the zero regulator 91 which reduces the gas pressure to zero gauge, through the connectors 92, to limiting orifice valves (not shown) which are set to fix the proportion of gas flow through second inputs (not shown) in the mixing means 75. The air flows through the venturis (not shown) from the outputs of the throttle valves 85 at the first inputs (not shown) in the air-gas mixers 93; the gas is drawn into the air-gas mixers 93 through the limiting orifice valves (not shown) from the outputs of the zero regulators 91 through the connectors 92 at the second inputs (not shown) in the air-gas mixers 93. The combustible air gas mixture flows from the outlets of the air gas mixers 93 through the upper connectors 94, through the lower connectors 95, through the upper longitudinal manifolds 96a, 96a' and the lower longitudinal manifolds 96b, 96b' and through the upper longitudinal burners 98a, 98a' and the lower longitudinal burners 98b, 98b'. Upon actuating the igniting means 78, gas flows from the gas supplying means 74 through the gas connector 100, to the control valve 101 which automatically shuts off in the event of an electrical power failure, through the zero regulator 102 which reduces the gas pressure to zero gauge, to a limiting orifice valve (not shown) which is set to fix the proportion of gas flow through a first input (not shown) in the air-gas mixer 103, and air is drawn from the air supplying means 73 through the air connector 104, to a venturi (not shown) which causes the air to increase in speed and drop in pressure through a second input (not shown) in the air-gas mixer 103. The air flows through the venturi (not shown) from the output of the air connector 104 at the second input (not shown) in the air gas mixer 103; the gas is drawn into the air gas mixer 103 through the limiting orifice valve (not shown) from the output of the zero regulator 102 at the first input (not shown) in the air-gas mixer 103. The combustible air-gas mixture flows from the outlet of the air gas mixer 103 through the connectors 105, through the flexible hoses 106, to the pilot tips 107. The pilot tips 107 are then ignited, for example, by actuation of spark ignitors (not shown) which are attached to the pilot tips 107, to establish the pilot flames at the ends of each of the longitudinal burners, whereupon the flame propagates from module to module along each of the longitudinal burners igniting the combustible air gas mixture therein to complete ignition thereof. The ignited combustible air gas mixture in the longitudinal burners causes the modules 99 to heat the contoured refractory members, to generate very high temperatures thereby, which generates the transfer of heat from the surfaces thereof to the consumable matter. Upon actuating the steaming means 60, steam flows from a source of pressurized steam through the steam manifold 64 and the extender portions 65, 65' thereof, through the orifices 66 which are preferably of sufficient number and location to provide sufficient volume and distribution of the steam, through the gaps (not shown), onto the condensate pan bottom wall 70, whereupon the steam is dissipated and deflected and the steam vapors mushroom upwardly therefrom through the opening between the top walls 68, 68', through the conveyor 40 into the steam hood 120. To operate the apparatus in a live steam mode, condensed steam is continuously drained from the condensate pan 67 through the condensate drain 72, which extends to one side of the conveyor 40, into the drip pan 109 and through the drain 111. To operate the apparatus in a wet steam mode, the condensate drain 72 is closed, whereby the condensate fills the condensate pan 67 to a level which is maintained by spouts on the side portions of an end wall (not shown), and the steam vapors bubble through the condensate. The steam vapors are enclosed in the steam hood 120 to provide a hot, humid atmosphere for the steaming operation. Upon actuating the conveying means 14, the drive motor 42 generates rotation of the drive shaft 43, which in turn produces rotation of the drive shaft 43, which in turn produces corresponding rotation of the drive sprocket 44, the chain 48, the driven sprocket 47, the gear shaft 46, and the gear sprockets 49 whereby the gear teeth (not shown) mesh with the conveyor 40, which in turn causes corresponding rotation of the takeoff-end idler gear sprockets 52 and the takeoff-end idler shaft 51, the center idler gear sprockets 55 and the center idler shaft 54, the load-end idler gear sprockets and the load-end idler shaft (not shown) and the carrying gear sprockets 59 and the cross shaft 58. The conveyor 40 moves on the side loops 40b, 40b' along the guide rails 35, 35', and one the chain belt 40a which meshes with the gear sprocket teeth (not shown). The consumable matter is loaded on the conveyor 40 at the load end of the apparatus by automatic or manual loading, and is conveyed through the steaming means 70 and the broiling means 71 to the takeoff end of the apparatus, where the consumable matter is unloaded by automatic or manual unloading. Upon actuating the directing means 15, the steam vapors from the steaming means 60 are drawn through the end of the steam hood 120, whose top generally corresponds in height to the bottom of the broiler hood 124 and which provides a draft, which may be manipulated to change the ambient temperature therein by extending the steam hood end portions 123, and are drawn towards the takeoff end of the apparatus and into and through the broiler hood 124, and the emissions from the broiling means 61 are drawn through the broiler hood 124. Upon actuating the sanitizing means 62, the transverse spray bar 108 generates a spray which removes condensate, moisture, fats, oils and grease from the conveyor 40. To service the apparatus, the steam hood 120, the condensate pan 67, the drip pan 109, and the longitudinal burners 98 are removable from their mountings, and the broiler hood 124 is hingedly mounted, to enable inspection, repair, maintenance and sanitizing thereof.

The dwell of the consumable matter in the steaming means 60 and the broiling means 61 is controllable by adjusting the speed of the variable-speed drive motor 42, and, by varying the steam flow rate and the combustible air-gas mixture input, the apparatus can be effectively utilized for a wide variety of food processing operations. To adjust the tension in the conveyor 40, the operator adjusts the adjustment means (not shown) in which the first pillow blocks 45, 45' are mounted, and adjusts the adjustable housing 57 in which the second pillow blocks 56, 56' are mounted. The flexible hoses 106 of the igniting means 78 provide the necessary flexibility to enable the longitudinal manifolds 96, which are connected to the longitudinal burners 98 through connectors 97 and to which the pilot tips 107 are connected, to be adjusted with respect to the fixed position connector 105.

The conveyor chain belt 40a meshes with the driving means gear teeth (not shown) and moves along the guide rails 35, 35' on the conveyor side loops 40b, 40b' from the load end through the steaming means 60 and the broiling means 61 to the takeoff end, to thereby provide continuous and uniform processing of the consumable matter. The steam manifold 64 channels the pressurized steam through the orifices 66 and the gaps onto the condensate pan bottom wall 70 which dissipates the kinetic energy and momentum thereof and causes the steam vapors to spread and mushroom upwardly to the consumable matter, to thereby regulate the flow of pressurized steam and steam vapors, and to prevent the dispersal of the food products. The steam hood top cover 122, end portions 123, and broiler hood 124 provide a draft for the steam vapors and the broiler smoke, to thereby direct the flow of the exhaust vapors and emissions.

While the present invention has been particularly set forth in terms of specific embodiments thereof, it will be evident that in view of the instant disclosure, that numerous variations upon the invention are now enabled to those skilled in the art, which variations in propriety are yet within the true scope of this teaching. Accordingly, the invention is to be broadly construed, and limited only by the scope and spirit of the claims appended hereto.

I claim:

1. Apparatus for processing consumable matter, which comprises:
    a. a support frame;
    b. means for conveying the consumable matter through the food processing means;
    c. means for processing the consumable matter, which are supported in the support frame, which comprises means for steaming the consumable matter, which comprises a steam source, s steam manifold which extends generally beneath the conveying means, and which includes a bottom surface thereof with an orifice therein, and a condensate pan which includes a bottom portion thereof which extends generally beneath the steam manifold, with a gap formed between the steam manifold orifice and the condensate pan bottom portion, and means for broiling the consumable matter.

2. A processing apparatus as recited in claim 1, in which the broiling means comprises means for supplying air, means for supplying gas, means for mixing the gas supplied by the gas-supplying means and the air supplied by the air-supplying means, means for heating the consumable matter, means for connecting the heating means and the mixing means, and means for igniting the heating means.

3. A processing apparatus as recited in claim 2, in which the air supplying means comprises an air blower, a blower housing, means for driving the air blower, an air manifold, a first connector which connects the air manifold to the blower housing, a throttle valve which is connected to the air manifold, and a second connector which connects the throttle valve to the mixing means.

4. A processing apparatus as recited in claim 3, in which the gas supplying means comprises a gas source, a gas manifold, a first connector which connects the gas manifold to the gas source, a zero regulator which regulates the gas pressure to zero guage and which is connected to the mixing means, and a second connector which connects the zero regulator to the gas manifold.

5. A processing apparatus as recited in claim 4, in which the mixing means comprises an air-gas mixer, which includes a speed-increasing pressure-dropping air flow control throat portion and a limiting orifice gas flow control portion therein.

6. A processing apparatus as recited in claim 5, in which the heating means comprises a burner which includes a contoured refractory member which is scrubbed with ignited fuel from the mixing means, and which generates heat transfer therefrom to the consumable matter.

7. A processing apparatus as recited in claim 6, in which the heating means comprises burners, which extend alongside the conveyor generally thereabove and therebelow, which comprise contoured refractory members which are scrubbed with ignited fuel from the mixing means, and which generate heat transfer therefrom to the consumable matter.

8. A processing apparatus as recited in claim 7, in which the igniting means comprises a zero regulator, a first connector which connects the zero regulator with the gas source, an air gas mixer, a second connector which connects the air gas mixer with the air source, a third connector which connects the air gas mixer with the zero regulator, a pilot ignitor which ignites the fuel, and a fourth connector which connects the pilot ignitor to the air gas mixer.

9. A processing apparatus as recited in claim 8, in which the driving means further comprises means for adjusting the tension in the conveyor.

10. A processing apparatus as recited in claim 9, in which the driving means includes a variable-speed drive motor.

11. Apparatus for processing consumable matter, which comprises:
   a. a support frame;
   b. means for conveying the consumable matter through the food processing means;
   c. means for processing the consumable matter, which are supported in the support frame, which comprises means for steaming the consumable matter, which comprises a steam source, a steam manifold which extends generally beneath the conveying means, and which includes a bottom surface thereof with orifices therein, and a consensate pan which includes a bottom portion thereof which extends generally beneath the steam manifold, with gaps formed between the steam manifold orifices and the condensate pan bottom portion, and means for broiling the consumable matter.

12. Apparatus for processing consumable matter, which comprises:
   a. a support frame;
   b. means for processing the consumable matter, which are supported in the support frame, which comprises means for steaming the consumable matter, and means for broiling the consumable matter;
   c. means for conveying the consumable matter through the food processing means; and
   d. means for directing a draft for exhausting the food processing means, which comprises a steam hood, which extends generally above the steaming means and which includes an end opening therein, a broiler hood which extends generally above the broiling means and which includes an end opening therein which is aligned with the end opening of the steam hood, and an exhaust blower, which draws the exhaust draft through the steam hood and the broiler hood.

13. Apparatus for processing consumable matter which comprises:
   a. a support frame
   b. means for processing the consumable matter, which are supported in the support frame, which comprises means for steaming the consumable matter, and means for broiling the consumable matter; and
   c. means for conveying the consumable matter through the food processing means, which comprises a conveyor, which comprises a chain belt, and side loops which are connected to the sides of the chain belt, and means for driving the conveyor through the support frame, which includes a drive motor, a gear shaft which is rotatably journalled in the support frame, means for transmitting the motor drive to the gear shaft, and a gear sprocket which is keyed to the gear shaft and which includes gear teeth whose pitch corresponds to the pitch of the chain belt.

* * * * *